UNITED STATES PATENT OFFICE.

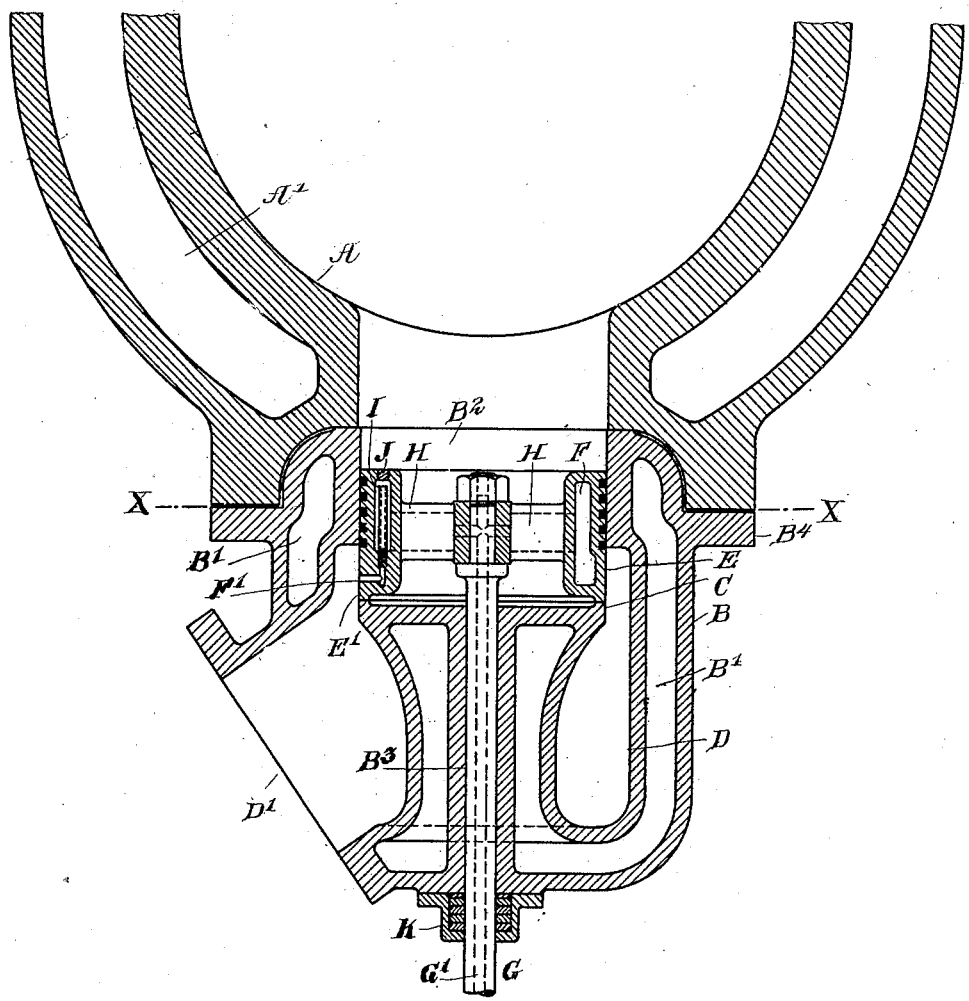

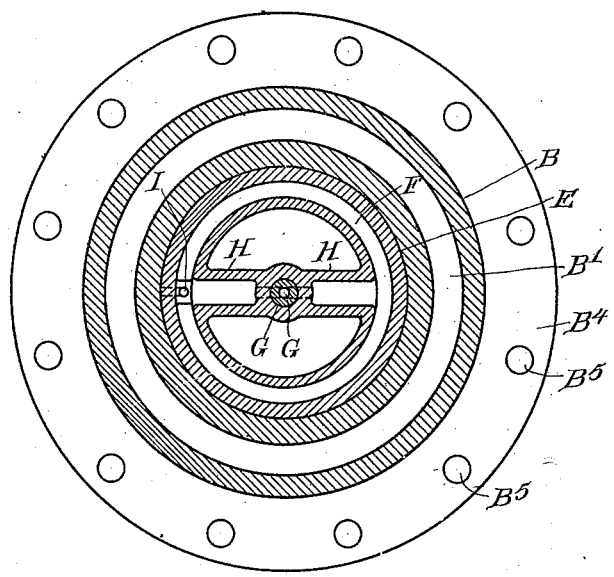

BAXTER M. ASLAKSON, OF SALEM, OHIO.

BALANCED VALVE.

985,879.

Specification of Letters Patent.   Patented Mar. 7, 1911.

Application filed October 14, 1907. Serial No. 397,412.

*To all whom it may concern:*

Be it known that I, BAXTER M. ASLAKSON, a citizen of the United States, and a resident of Salem, in the county of Columbiana and State of Ohio, have invented certain new and useful Improvements in Balanced Valves, of which the following is a specification.

My invention relates to balanced valves and particularly in the present case is adapted for use in gas engine construction.

The object of my invention is to provide a valve that will be practically balanced, and that may be sufficiently cooled to operate properly when used in gas engine construction, though it may be used without the cooling provision in cases where this feature is not required, and a further object is to provide a casing or housing for the valve which may be easily removed from the engine or other device on which it may be located, and to have provision for cooling the valve casing.

Referring to the drawings which form a part of this specification,—Figure 1, is a sectional view through my valve and a section of the cylinder of a gas engine, showing the valve as applied to a gas engine for use as an exhaust valve. Fig. 2, is a cross sectional view through the valve on line $x$—$x$ of Fig. 1.

A, indicates a section of a gas engine cylinder and A', a chamber serving as a water jacket.

B, refers to the valve casing and B', a chamber serving as a water jacket. A valve seat C, is preferably formed integral with and is supported from the lower end of the casing in such a manner as to form an annular chamber D, which has an outlet D'.

The valve proper E, consists of a cylindrical ring, the lower end E' of which is formed to serve as the valve face and effect a tight joint when in contact with valve seat C. The surface of the ring may be provided with grooves for the reception of packing rings to provide a tight sliding joint in the cylindrical portion B² of the valve casing. When the invention is to be used as an exhaust valve for gas engines, I prefer to make the ring constituting the body of the valve, with a double wall as shown, thus presenting an annular chamber F, which is in open communication with a conduit G' formed in the valve stem G by way of the hollow spokes H—H, as indicated by the dotted lines, the construction being readily understood.

An outlet from the annular chamber F is indicated at F', and communicates through a pipe I with the chamber F at its upper end. The pipe I is inserted in the chamber through an opening which is closed by the plug J. The function of the pipe I is to cause the water within chamber F to rise to the top of said chamber before it can overflow through the outlet F' and thereby cool the valve ring E. A guide-way B³, is formed in the casing B through which the stem G projects, and a stuffing-box K is provided to prevent leakage around the valve rod G at this point. The casing is provided with a flange B⁴, having holes B⁵, etc., through which bolts are inserted to hold the casing B to the cylinder A.

The operation of the device is as follows: Gases within the cylinder A will pass through the ring E and exert a balancing effect on the top and bottom walls of the chamber F, with the exception of the area represented by the width of the valve face E', where it rests on the valve seat C, therefore, the only pressure of gases tending to hold the valve in an unbalanced position would be the area represented by said face of the valve and the area of the diameter of the valve stem G. When the valve ring E is raised, thus opening the valve, the gases will flow from the cylinder A, past the spokes H of the valve ring E, into the annular discharge chamber D and through the outlet D' to the atmosphere. The circulation through the valve ring will be through the conduit in the valve stem G', and spokes H, to the annular chamber F, filling said annular chamber and overflowing through the pipe I to outlets F' and D'.

By forming the water chamber B' around the valve stem G, the latter is kept cool, and the contour of the walls serving as a support for the valve seat is such as to result in a firm and rigid valve seat, which in expanding and contracting under varying temperatures, will be caused to move in correct alinement with the valve face of the ring E, thus avoiding liability of leakage due to change of temperature.

Having thus described my invention, what I claim as new and desire to secure by Letters Patent, is,—

1. A balanced valve comprising a casing having a cylindrical bore and a valve seat, and a ring slidably mounted in said bore, said ring having an annular water chamber formed therein and constructed to form the sole passage for the exhaust gases and engage said valve seat with its lower end, a cross bar extending from one side of said ring to the opposite side and having a conduit in open communication with said annular chamber, and a valve stem having a conduit therein in open communication with said first named conduit and chamber, said annular chamber having an outlet therefrom for the purpose set forth.

2. A balanced valve comprising; a hollow ring mounted in the exhaust passage of an engine to be reciprocated therein, and having a central opening for the passage of the exhaust gases from said engine, said ring having an annular water chamber having conduits leading thereto; a valve rod having a central water passage leading to said annular chamber; a drainage device located in said chamber to drain the same from near the top; and suitable packing on the outside of said ring to prevent the passage of the exhaust gases except through the central passage in the said ring.

3. A balanced valve comprising a casing having a cylindrical bore provided with an inlet at one end and an outlet at its opposite end, and having a valve seat located adjacent to said outlet; a ring adapted to slidingly engage said bore and its lower end engage said valve seat, said ring having an annular chamber formed in its wall; a valve stem connected to said ring and having a passage which communicates with said annular chamber, said ring having an outlet from said annular chamber opening into said first named outlet.

4. A balanced valve comprising a casing having a cylindrical bore provided with an inlet at one end and an outlet at its opposite end, and having a valve seat located adjacent to said outlet, and having a chamber formed in its wall; a ring adapted to slidingly engage said bore and its lower end engage said valve seat, said ring having an annular chamber formed in its wall; a valve stem connected to said ring and having a passage which communicates with said annular chamber, said ring having an outlet from said annular chamber opening into said first named outlet.

Signed at Salem, in the county of Columbiana and State of Ohio, this 16th day of September A. D. 1907.

BAXTER M. ASLAKSON.

Witnesses:
HARRY DEWER,
R. B. CAREY.